Oct. 30, 1956 R. E. STILWELL 2,768,639
AUTOMATIC LIQUID DRAIN VALVE
Filed May 20, 1953 2 Sheets-Sheet 1
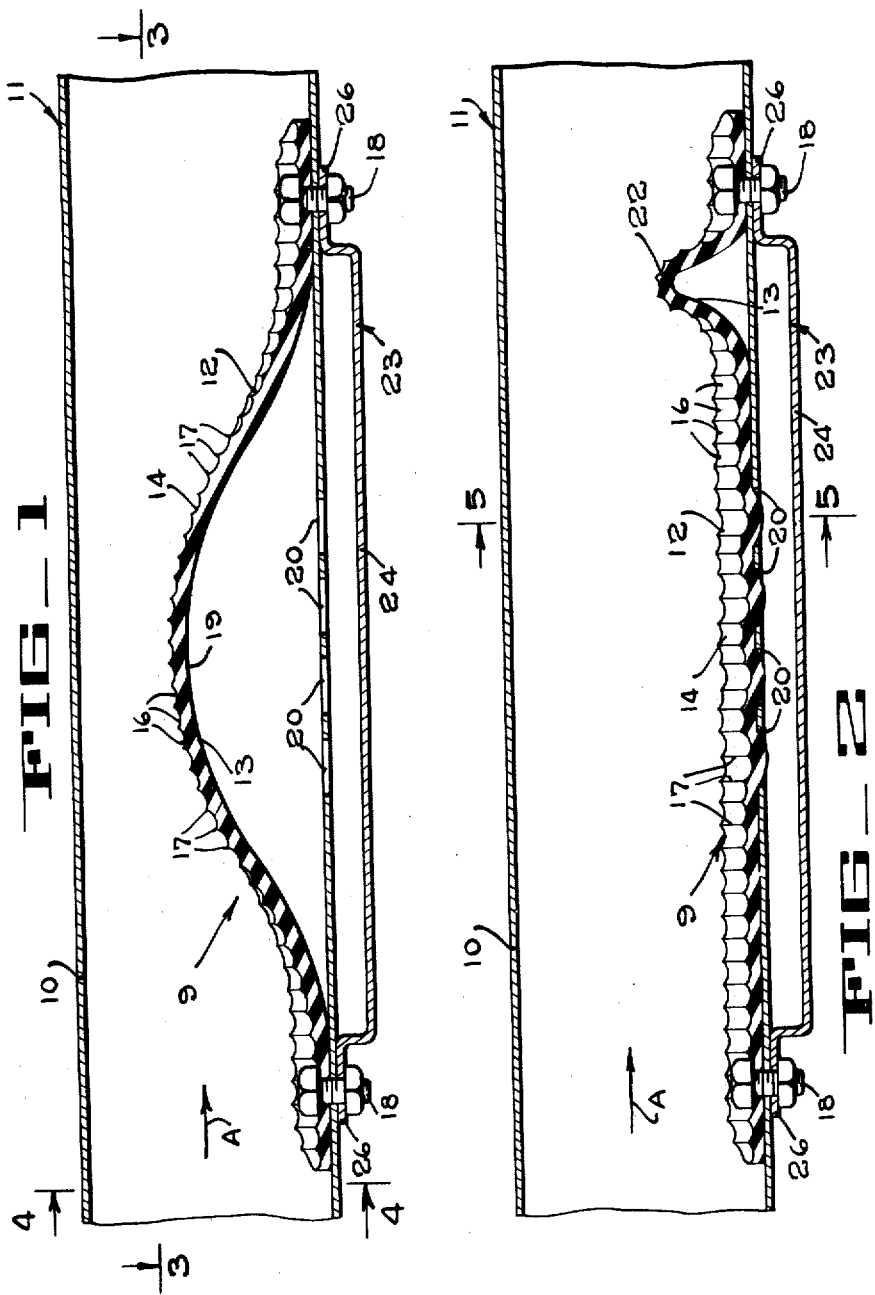
INVENTOR
ROBERT E. STILWELL
BY Hans G. Hofmeister
ATTORNEY Oct. 30, 1956 R. E. STILWELL 2,768,639
AUTOMATIC LIQUID DRAIN VALVE
Filed May 20, 1953 2 Sheets-Sheet 2
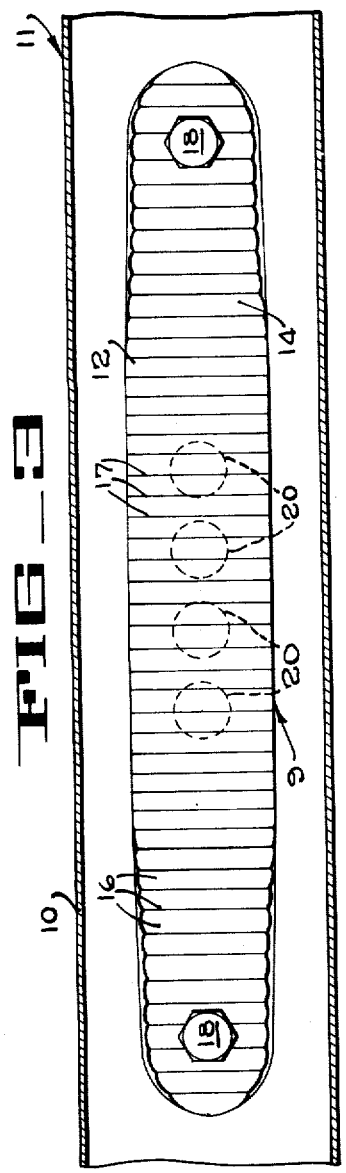
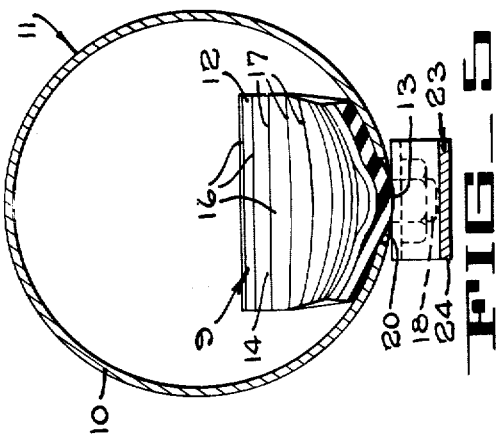
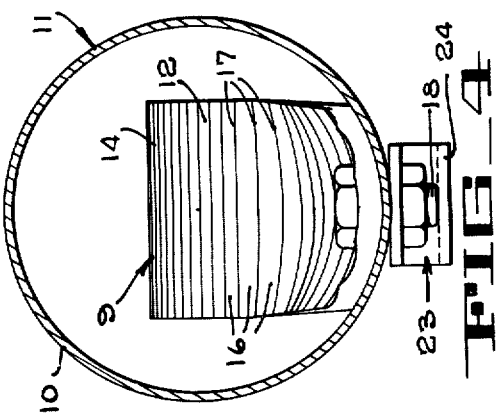
INVENTOR
ROBERT E. STILWELL
BY Hans G. Hoffmeister
ATTORNEY

United States Patent Office 2,768,639
Patented Oct. 30, 1956

2,768,639

AUTOMATIC LIQUID DRAIN VALVE

Robert E. Stilwell, Santa Clara, Calif., assignor to Food Machinery and Chemical Corporation, San Jose, Calif., a corporation of Delaware Application May 20, 1953, Serial No. 356,270

7 Claims. (Cl. 137—107)

The present invention relates to automatic liquid drain valves of the type responsive to changes in liquid pressure.

The present drain valve is particularly well suited for employment in portable irrigation systems which generally comprise a series of light-weight pipe sections coupled together to form a portable pipe line. Such a pipe line is adapted for detachable connection with, and lateral extension from, a header conduit arranged along one side of the area to be irrigated. Water pumped through the header conduit and into the portable pipe line is distributed to the area around the pipe line by sprinklers provided at spaced intervals along the line. The header conduit is adapted to have the portable pipe line connected to it at various control stations along its length and it is common practice to irrigate an entire field with only one portable pipe line by progressively connecting the pipe line and irrigating at succeeding control stations along the header conduit.

It is customary when the portable pipe line is to be moved to the next irrigating station either to drag it, or, should it be equipped with wheels, to roll it over the ground to its next irrigating position. In either event, it is first necessary to drain the water remaining in the line after the water is shut off and the line disconnected from the header conduit, because when filled with water the line is too heavy to move.

One object of the present invention is to provide an improved drain valve for a hydraulic system which will automatically open when the liquid pressure in the system is substantially relieved and which will close automatically when the liquid pressure in said system is resumed.

Another object of this invention is to provide a simple and inexpensive valve for quickly and automatically controlling the drainage of liquid from portable irrigation pipe lines upon variations in the velocity of the liquid therein.

These and other objects and advantages of the present invention will become apparent from the following description and the accompanying drawings wherein:

Fig. 1 is a fragmentary longitudinal sectional view through a portable irrigation pipe section provided with the drain valve of the present invention.

Fig. 2 is a view similar to Fig. 1 with the drain valve shown in a different operative position.

Fig. 3 is a fragmentary horizontal section taken approximately on the line 3—3 of Fig. 1.

Fig. 4 is a transverse section taken on the line 4—4 of Fig. 1.

Fig. 5 is a transverse section taken on the line 5—5 of Fig. 2.

The present drain valve 9 (Figs. 1 through 5) is here shown employed in a pipe section 10 of a portable irrigation pipe line 11. The drain valve 9 comprises a long, narrow, relatively thin element 12 made of rubber or other flexible and resilient material. The bottom or outer surface 13 (Fig. 1) of the valve element 12 is smooth while the top or inner surface 14 thereof is provided throughout its length with a series of transverse flutes 16 forming a complementary series of transverse ribs 17.

The valve element 12 (Fig. 1) is mounted in a longitudinally extending position within the pipe section 10 by a pair of machine bolts 18 which secure the opposite ends of the element to the bottom of the pipe section 10. The distance between the bolts 18 is less than the length of the flexible valve element 12 between its points of attachment to the pipe section 10 and, consequently, that portion of the valve element between said bolts 18 normally assumes a slight upwardly arched or buckled position spaced from the bottom of the pipe section, as shown at 19 in Fig. 1. In the bottom of the pipe section 10 intermediate the bolts 18 there is provided a longitudinal series of drain outlets 20 arranged to be controlled by the valve element 12. The slightly buckled or bowed position of the valve element 12, shown in Fig. 1, corresponds to the open position of the valve 9 and when the element 12 is in this position water can drain freely from the pipe line 11 through the outlets 20.

For the purpose of describing the closing of the valve 9 as the pipe line 11 is filled with water the direction of water flow through the pipe line will be assumed to be in the direction of the arrow A (Figs. 1 and 2) although it should be understood that the valve will operate equally well should the water flow be in the opposite direction. When water is initially supplied to the pipe line 11 the water flowing therethrough strikes the slightly buckled valve element 12 flexing it down over the drain outlets 20 thereby partially closing them. Simultaneously therewith the buckled portion of the element 12 is pushed away from the drain outlets 20 to the downstream end of the element where it assumes a sharply arched and contracted position, as shown at 22 in Fig. 2. As water continues to flow into the pipe line, eventually filling it, the pressure within the line builds up thus increasing the pressure on the valve element 12 and vigorously forcing water through the drain outlets 20. The pressure at the lower surface 13 of the valve does not increase as much as the pressure on the top surface 14 because of the reduction in pressure adjacent the drain outlets 20 that accompanies the rapid flow of water through said outlets. Hence, shortly after the build-up of pressure in the pipe line 11 the greater pressure on the top surface of the element 12 presses it down tightly over the drain outlets 20, thereby completely closing them as shown in Figs. 2 and 5.

The transverse ribs 17 on the upper surface 14 of the valve element 12 have a twofold purpose. First, they aid in forcing the valve element down over the outlets 20 by providing an uneven inner surface which offers more resistance to the flow of water over it than if the upper surface 14 were smooth like the outer surface 13. The additional force thus exerted upon the inner surface of the valve element 12 by the water flowing through the pipe line causes a speedier closing of the valve 9 under the normal rate of water flow. Furthermore, said additional force makes possible a closing of the valve 9 at lower rates of flow than would be otherwise possible. Secondly, the transverse ribs 17 give the valve element 12 a certain amount of transverse rigidity which helps it to withstand the operating liquid pressure within the conduit which tends to force it through the drain outlets 20, thereby causing the valve to leak. In this connection, however, it should be noted that the transverse ribs 17 in no way adversely affect the longitudinal flexibility or resilience of the valve element 12.

When the flow of water in the pipe line 11 is shut off and the pressure therein substantially reduced the valve element 12 due to its resiliency, will spring back to its normal slightly arched position, shown at 19 in Fig. 1, uncovering the outlets 20 and permitting the water in the pipe line 11 to drain therefrom. Resumption of the flow of water in the pipe line 11 in either direction will automatically cause the valve 9 to close in the manner previously described. While only one valve 9 has been herein shown and described it will be understood that in a long pipe line a number of the valves 9 will be placed at convenient intervals along said pipe line so that it may be drained as quickly as possible. Furthermore, said valves 9 may be placed in the coupling sections (not shown) of said pipe line 11 rather than in the pipe sections 10 thereof.

To prevent erosion of the soil adjacent the drain outlets 20 an elongated blade 23 is secured by the bolts 18 to the outer surface of the pipe section 10 beneath the outlets 20. The main portion 24 of said blade is vertically offset from its securing feet 26 in order to space it from the outlets 20. Water draining from the pipe section 10 through the outlets 20 will be intercepted by the blade 23 and diffused horizontally so that it will not strike the ground in a small number of concentrated streams which would tend to wash away the earth beneath the drain outlets.

Although the drain valve 9 is herein shown and described in connection with a portable irrigation pipe line, wherein both the impingement force of water flowing longitudinally of the valve element 12 and the pressure differential between the upper and lower surfaces of said valve element contribute to close the valve 9, it will be apparent from the foregoing description that the valve is by no means limited to such use. For instance, the drain valve 9 may be employed in hydraulic systems where there is no sustained flow in any particular direction and only the aforesaid pressure differential between the upper and lower surfaces of the valve element 12 can be relied upon to close the valve 9. While closing of the drain valve 9 in such systems will be somewhat slower than where the direct impingement of liquid against the upper surface of the valve element 12 may also be utilized to press it toward a closed position, nevertheless, said valve will close satisfactorily in the absence of such a force.

While I have disclosed a preferred embodiment of the present invention, it will be understood, however, that various changes and modifications may be made in the details thereof without departing from the spirit and scope of the appended claims.

Having thus described the invention what I claim as new and desire to protect by Letters Patent is:

1. An automatic drain valve for a hydraulic system having a liquid containing member provided with a drain outlet comprising a flexible, resilient, valve element and longitudinally spaced means on opposite sides of the drain outlet adapted to secure the valve element to the inner wall of the liquid containing member in a concavely arched and initially resiliently stressed position over the drain outlet to normally space the valve element from the outlet and maintain the drain outlet open, whereby upon the presence of a substantial water pressure in the liquid containing member said pressure will push the valve element into sealing relationship with the drain outlet thereby closing the same, the resiliency of the valve element being sufficient to cause said element to resume its spaced, concavely arched open position over the drain outlet, whenever the water pressure in the liquid containing member is substantially reduced, to drain the liquid from said member.

2. An automatic drain valve for an irrigation pipe line having a drain outlet therein comprising a step-like flexible, resilient, valve element, and means adapted to secure the element to the inner wall of the pipe line in a longitudinally extending vertical plane in a concavely arched, open position over said drain outlet, whereby upon substantial flow of water through said pipe line in either direction the impingement of the flowing water against the concavely arched portion of the valve element will flex said element toward the drain outlet and in cooperation with the water pressure in the pipe line close the drain outlet, the resiliency of the element being sufficient to cause it to resume its open concavely arched position over the drain outlet whenever the water pressure in the pipe line is substantially reduced.

3. An automatic drain valve for an irrigation pipe line having a group of spaced drain outlets in the lowermost portion of said pipe line comprising a thin, elongated, flexible, resilient valve element; means fastened to the pipe line in a vertical axial plane at opposite ends of the group of drain outlets for securing the valve element to the pipe line in a longitudinally and inwardly bowed, open position over the group of drain outlets, whereby upon substantial flow of water through said pipe line in either direction the impingement of the flowing water against the longitudinally bowed portion of the valve element will flex said element down over the group of drain outlets moving the bowed portion of the valve element away from the drain outlets and in cooperation with the water pressure in the pipe line close the entire group of drain outlets, the resiliency of the valve element being sufficient to cause it to resume its open, bowed position over the group of drain outlets whenever the water pressure in the pipe line is substantially reduced to drain the water from the pipe line.

4. An automatic drain valve for an irrigation pipe line having a drain outlet therein comprising a flexible, resilient, valve element inside the pipe line and overlying the drain outlet; longitudinally spaced means on opposite sides of the drain outlet for securing the valve element to the pipe line, the distance between the spaced securing means being less than the length of the element between its points of securement to the pipe line so that the flexible resilient valve element will buckle in a longitudinally extending plane away from the walls of the pipe line intermediate its securing means to normally maintain the drain outlet thereunder open, whereby upon substantial flow of water through said pipe line in either direction the impingement of the flowing water against the valve element will flex said element toward the drain outlet moving the buckled portion of the valve element away from the drain outlet and in cooperation with the water pressure in the pipe line close the drain outlet, the resiliency of the element being sufficient to cause it to resume its open buckled position over the drain outlet whenever the water pressure in the pipe line is substantially reduced.

5. An automatic drain valve for an irrigation pipe line having a drain outlet therein comprising a flexible, resilient, valve element inside the pipe line and overlying the drain outlet; a plurality of projections on the surface of the element facing away from the drain outlet; longitudinally spaced means on opposite sides of the drain outlet for securing the valve element to the pipe line, the distance between the spaced securing means being less than the length of the element between its points of securement to the pipe line so that the flexible resilient valve element will buckle in a longitudinally extending plane away from the walls of the pipe line intermediate its securing means to normally maintain the drain outlet thereunder open, whereby upon substantial flow of water through said pipe line in either direction the impingement of the flowing water against the inner surface of the buckled portion of the valve element will flex said element toward the drain outlet moving the buckled portion of the valve element away from the drain outlet and in cooperation with the water pressure in the pipe line close the drain outlet, the resiliency of the element being sufficient to cause it to resume its open buckled position over the drain outlet whenever the water pressure in the pipe line is substantially reduced.

6. An automatic drain valve for an irrigation pipe line having a drain oulet therein comprising an elongated, flexible, resilient, valve element inside the pipe line and overlying the drain outlet; a plurality of substantially transverse ribs on the surface of said element facing away from the drain outlet; longitudinally spaced means on opposite sides of the drain outlet for securing the valve element to the pipe line, the distance between the spaced securing means being less than the length of the element between its points of securement to pipe line so that the flexible, resilient, valve element will buckle in a longitudinally extending plane away from the walls of the pipe line intermediate its securing means to normally maintain the drain outlet thereunder open, whereby upon substantial flow of water through said pipe line in either direction the impingement of the flowing water against the buckled portion of the ribbed inner surface of the valve element will flex said element toward the drain outlet moving the buckled portion of the valve element away from the drain outlet and in cooperation with the water pressure in the pipe line close the drain outlet, the resiliency of the element being sufficient to cause it to resume its open buckled position over the drain outlet whenever the water pressure in the pipe line is substantially reduced.

7. A valve element for an automatic drain valve adapted to be mounted within a conduit and positioned over a drain port provided in the conduit comprising an elongated, strap-like body portion extending longitudinally in the direction of fluid flow through the conduit, and a plurality of transverse ribs formed on the inner surface of said body portion thereby providing transverse stiffness and longitudinal flexibility to said element, said element being adapted to be automatically moved to an initial resiliently stressed bowed conformation to open said drain ports and adapted to be automatically deflected into a port-closing position when a substantial liquid pressure is exerted thereupon.

References Cited in the file of this patent

UNITED STATES PATENTS

| | | |
|---|---|---|
| 2,646,059 | Wittner et al. | July 21, 1953 |
| 2,649,105 | Stout et al. | Aug. 18, 1953 |

FOREIGN PATENTS

| | | |
|---|---|---|
| 545,646 | Germany | Mar. 4, 1932 |
| 932,496 | France | Mar. 23, 1948 |

U. S. DEPARTMENT OF COMMERCE
PATENT OFFICE

CERTIFICATE OF CORRECTION

Patent No. 2,768,639    Robert E. Stilwell    October 30, 1956

It is hereby certified that error appears in the printed specification of the above numbered patent requiring correction and that the said Letters Patent should read as corrected below.

Column 3, line 68, for "step-like" read --strap-like--.

Signed and sealed this 24th day of June 1958.

(SEAL)
Attest:
KARL H. AXLINE
Attesting Officer

ROBERT C. WATSON
Commissioner of Patents